Patented June 24, 1941

2,246,762

UNITED STATES PATENT OFFICE 2,246,762

METHOD FOR CONDENSATION

Erik Schirm, Dessau in Anhalt, Germany, assignor, by mesne assignments, to "Unichem" Chemikalien Handels A.-G., Zurich, Switzerland, a corporation of Switzerland No Drawing. Application December 20, 1935, Serial No. 55,369. In Germany December 22, 1934

3 Claims. (Cl. 260—624)

It is already known to condense olefines and cyclo-olefines by means of catalysts with aromatic hydrocarbons or phenols by using as condensing agents especially sulfuric acid, mixtures of sulfuric acid and glacial acetic acid, hydrochloric acid, zinc chloride, aluminium chloride, surface catalysts such as bleaching clays and others.

Now it has been found that it is practicable to perform the aforesaid condensations in a much more advantageous manner by the use of aqueous perchloric acid as catalyst. Thus the reactions not only take a smoother and quicker course, but in many a case they are realized also at lower temperatures, so that disturbing secondary reactions are eliminated to a great extent. Compared with sulfuric acid which very often is employed as condensing agent, the perchloric acid offers also the advantage of excluding secondary reactions and therefore a loss of materials that might be caused by the sulfonating effect of the sulfuric acid. In suitable circumstances salts of perchloric acid can be substituted as an equivalent for the perchloric acid itself.

The amount of perchloric acid necessary for a sufficiently rapid course of the condensation reactions is very small and even this small amount can be mechanically separated in most of the cases—in a practically complete manner—from the reaction mixture in order to be re-employed for further condensations so that the real consumption of catalysts is reduced to a minimum.

The concentration of the perchloric acid varies between wide limits, as in certain cases an aqueous acid of 20–25% is sufficient to catalyse the condensations with quite a satisfactory efficiency whilst in other cases perchloric acid of 60–70% is recommended. One may also advantageously use as catalysts aqueous mixtures of perchloric acid with sulfuric acid, acetic acid or phosphoric acid.

The reaction temperatures vary between a few degrees below zero up to 130–140° C. according to the reaction capacity of the employed components.

As aromatic components for the present condensation method there may be mentioned e. g.: benzene hydrocarbons, naphthalene, anthracene, phenanthrene, dihydronaphthalene, tetrahydronaphthalene, octahydro-naphthalene, decahydronaphthalene, octahydro-anthracene, chlorbenzene, 1-chlornaphthalene, phenol and its homologues including toluol and substitution products such as chlor- and nitro-phenols and -cresols, resorcin, 1- and 2-naphthol, o- and p-hydroxydiphenyl, p,p'-dihydroxydiphenylmethane, the phenol- and naphthol ether, the dihydroxy- and trihydroxy-benzenes and their ethers, diphenylene oxide, methyl cyclohexene, anisol and the like.

Among olefinic hydrocarbons suitable for the present procedure there may be named e. g. the true olefines of ethylene up to its high molecular homologues such as cetene, octadecene, eicosene, docosene and the like, furthermore cyclo-olefines such as cyclo-pentene, cyclo-hexene and its homologues, pinene, camphene, octahydronaphthalene etc. and further the olefinic hydrocarbons of the aromatic series such as styrol, stilbene and cyclo-olefinic aromatic hydrocarbons such as dihydronaphthalene. Finally also substitution products of the hydrocarbons with olefinic double links may be used e. g. unsaturated halogen hydrocarbons, alcohols, aldehydes, ketones and carboxylic acids as well as derivatives and substitution products of those compounds. Furthermore when such substitution products are used it is possible to conduct the reaction in such a manner that the condensation occurs at the double link only so that the substituting groups, especially the primary alcohol group or also the carboxylic group remain unaltered. In this manner one obtains valuable technical products which allow of being advantageously used in various fields. Among easily accessible substitution products of olefine hydrocarbons there may be mentioned e. g.: allyl-bromide, allyl- and oleyl alcohol as well as their ethers and esters, as sperm oil, acroleine, croton aldehyde, cinnamic aldehyde, mesityl oxide, benzalacetone, acrylic acid, crotonic acid, undecylenic acid, oleic acid and elaidic acid, maleic acid and fumaric acid, cinnamic acid, tetrahydrobenzoic acid and so on, as well as the anhydrides and esters of these or similar acids.

Example 1

92 parts by weight of toluol and 15 parts by weight of a 70%-perchloric acid are heated up to 95–100° C. and while vigorously stirring one introduces into this mixture about 23 parts of isobutylene. In substituting for the pure isobutylene the gas mixture obtainable in treating isobutyl alcohol with dehydrating means such as zinc chloride or phosphoric acid, the isobutylene is absorbed with preference by the reaction mixture, whilst the symmetric dimethyl-ethylene ("pseudo-butylene") escapes. After cooling one separates off the perchloric acid which is deposited entirely (and which may be reemployed for a new condensation), then one washes the toluol-solution first with water then with a diluted solution of soda and finally again with water until the solution is neutral, whereupon one dries the toluol-solution which is then submitted to the fractional distillation under atmospheric pressure. After the initial running with principally toluol one obtains as chief fraction, boiling at between 182 and 205° C. 45 parts of tertiary butyl-toluol (74% of the theoretical yield referred to the absorbed isobutylene) and a last running of about 5.5 parts boiling up to 245° C. and principally consisting of di-tertiary-butyl-toluol (13% of the theoretical yield).

Example 2

264 parts by weight of tetrahydronaphthalene, 136 parts of octahydronaphthalene (obtained from 2-decalol by treating it with dehydrating agents) and 30 parts of a 70%-perchloric acid are vigorously stirred for 8 hours at a temperature of 90–100° C. After isolating the perchloric acid which also in this case allows of being separated entirely, the oil layer is washed until it is neutral and fractionated under reduced pressure. As main product of the reaction one obtains a decalyl-tetrahydronaphthalene boiling under a 10 mm. Hg-pressure at 222–227° C. and the distillation-residue is a clear resin of a brittle hardness.

Example 3

126 parts by weight of naphthalene and 20 parts of a 70%-perchloric acid are heated up to 100–110° C. in a vessel provided with a strongly acting reflux-cooler and a stirring-gear; while stirring vigorously one drops in 35 parts of tri-methylethylene while regulating the speed of dropping in such a manner that the amount added is nearly consumed immediately. One continues stirring until any unaltered trimethylethylene doesn't condense any longer in the cooler, then one allows the perchloric acid to settle and draws it off while hot, whereupon one washes the oil while warm first with water, then with a solution of soda and then again with water and finally one dries and distills. First the unaltered naphthalene passes over, then follows at 290–300° C. the tertiary amyl-naphthalene formed as chief product which also in the cold remains liquid. The little residue that is left behind and boils at a higher temperature consists apparently of di-amylnaphthalene.

Example 4

62.7 parts by weight of phenol are dissolved in 90 parts of deca-hydronaphthalene. After an addition of 15 parts of a 70%-perchloric acid the mixture is warmed to 60° C. and while vigorously stirring 164 parts of cyclo-hexene are added little by little at a temperature of 60–70° C., whereby the mixture turns reddish-violet and especially at the beginning a development of heat will be observed. When the addition of the cyclo-hexene is completed one increases the temperature to 85° C. and by keeping it so for some hours after cooling the entirely settled perchloric acid is separated, then one dilutes the oil with 90 parts of benzene to facilitate the washing which is then done with a 10%-solution of common salt until a Congo-neutral reaction occurs and then one dries the product. Now one distills the benzene under ordinary pressure and then one fractionates under a reduced pressure. After a first running of deca-hydronaphthalene one obtains by fractionating under a 10 mm. Hg-pressure the following fractions:

I. 113–190° C. = 16 parts of principally cyclohexylphenols
II. 190–230° C. = 58 parts of principally di-cyclohexylphenols
III. 230–282° C. = 90 parts of principally tri-cyclohexylphenols
Residue = 26 parts of a brown resin of brittle hardness Total yield 196 parts The Fraction II is thickly-liquid, the Fraction III a viscous yellow resin.

If in the present example one reduces the amount of the cyclohexene the yield turns out more in favour of the mono- and di-cyclohexylphenols. In applying only 1 mol of cyclohexene to 2 mols of phenol one obtains almost exclusively a mixture of the two isomeric mono-cyclo-hexylphenols.

Example 5

108 parts by weight of o-cresol and 16 parts of a 70%-perchloric acid are warmed to 80° C. whereupon one adds under vigorous stirring and within about 1½ hours at 80–90° C., 112 parts of octene (obtained by distilling n-octylalcohol with a 89%-phosphoric acid). The condensation is simultaneous with a perceptible development of heat. Then one heats for further 4 hours and under constant stirring up to 100° C. whereupon one cools, dilutes with about 40 parts of benzene in order to reduce the viscosity of the reaction-mixture, the quantitatively precipitated perchloric acid is isolated and the benzene solution is then worked up as indicated in Example 4. During the distillation under 10 mm. pressure one obtains after a little preliminary running of cresol (34 parts) an oily distillate boiling at 157 to 220° C. and consisting substantially of the various isometric secondary octyl-o-cresols. The yield amounts to 178 parts corresponding to 81% of the theoretical yield.

Example 6

In a vigorously stirred mixture of 108 parts of m-cresol and 16 parts of a 70%-perchloric acid one introduces at room temperature a gaseous propylene, whereby the gas is vividly absorbed under self-warming of the reaction mixture. The mixture which at the beginning is non-homogeneous becomes homogeneous and clear after a short time. When the development of heat is diminishing one warms to 75° C. and continues introducing the propylene until 48 parts are absorbed which will be accomplished within about 4–5 hours. Towards the end of this operation the greater part of the perchloric acid precipitates. Now one dilutes with 50 parts of benzene, one separates from the acid layer and one works up as per Example 4. The distillation under a 11 mm. Hg-pressure gives the following fractions:

I. 91–120° C. = 81.3 parts light-yellow, liquid
II. 120–134° C. = 58.2 parts dark-yellow, liquid
Residue = 9.5 parts brown, thickly-liquid Total yield 149.0 parts = 95.5% of the theoretical yield (=156 parts)

Fraction I consists of a mixture of m-cresol with isomeric isopropyl-m-cresols from which the last-mentioned condensation-products may be separated off by a careful fractional distillation. Fraction II consists almost exclusively of a mixture of isomeric isopropyl-m-cresols, whilst the distillation-residue contains apparently and substantially di-isopropyl-m-cresols. By substituting in this example an equivalent amount of ethylene for that of the propylene, one obtains the corresponding ethylated m-cresols.

Example 7

128.5 parts by weight of p-chlorphenol are dissolved in 250 parts of deca-hydronaphthalene under slight heating, then 20 parts of a 70%-perchloric acid are added and after heating the mixture to 60° C. 84 parts of dodecene (obtainable by distilling n-dodecyl-alcohol with anhydrous zinc chloride) are dropped in while vigorously stirring at a temperature of 60–70° C., whereupon one continues stirring at 90–95° C. for 5 hours. In working up the reaction mixture from which in this case as in the previous examples the perchloric acid can be recovered almost quantitatively as per Example 4 but without addition of benzene one obtains as the main product a secondary-dodecyl-p-chlorphenol in the form of a thickly liquid oil of fungicide and bactericide properties, the yield of which is 104 parts corresponding to 70% of the theoretical yield. This oil forms the fraction of the distillate boiling under a 11 mm. Hg-pressure at 200–225° C. As distillation residue there remains a tar which probably has been formed by polymerisation of part of the dodecene.

Example 8

137 parts by weight of o-nitrotoluol mixed with 20 parts of a 70%-perchloric acid are stirred at 95–105° C. while propylene gas is introduced until the weight of the mixture has increased by 21 parts. When the reaction is finished the perchloric acid is eliminated and the reaction product is dried. In fractionating one obtains after a preliminary running of unaltered nitrotoluol a distillate that passes over at 230 to 240° C. and consists of isopropyl-o-nitrotoluol.

Example 9

148 parts by weight of 6-tetralol (ar.) and 130 parts of dihydronaphthalene are warmed to 60° C., then 20 parts of a 60%-perchloric acid are dropped into the mixture at 60–70° C. and under intensive stirring. Now one increases the temperature to 90° C. and keeps it so for 2 to 3 hours under constant stirring, whereupon the mass is worked up as specified in Example 4. The distillation in vacuo gives a good yield of a condensation product which by solidifying in the cold grows resin-like and which boils under a 10 mm. Hg-pressure at 240 to 245° C.

Example 10

72 parts by weight of 1-naphthol, 96 parts of methylcyclohexene and 25 parts of a 50% perchloric acid are heated under vigorous stirring until the condensation begins with self-heating. After finishing the reaction which is accompanied by a considerable increase of temperature one keeps the latter at 100° C. for 2 hours, then one cools whereupon one dilutes with 100 parts of benzene and one works up in the usual way.

The fractions resulting from the distillation in vacuo are as follows:

I. $Bp_2$ −188° C.=11 parts of recuperated naphthol
II. $Bp_2$ 198–265° C.=87.5 parts of viscous red resin
III. $Bp_3$ 269–316° C.=39.5 parts of hard red resin
   Residue=16 parts of dark resin of a brittle hardness The total yield of condensation products amounts to 85% of the theoretical yield.

Example 11

Into a mixture of 144 parts of 2-naphthol, 25 parts of a 60%-perchloric acid and 500 parts of deca-hydronaphthalene, 96 parts of 5-(methyl-cyclohexyl-)1-methyl-cyclohexene-1,2 (obtained from 4 - (methylcyclohexyl-) 2-methyl-cyclohexanol by dehydration) are stirred in little by little at 60–70° C. Then one warms up to 100° C. which temperature is kept for 4 hours and then one works up in the well-known manner. The distillation in vacuo after eliminating the deca-hydronaphthalene and the excess of naphthol gives a condensation product which while hot is viscous whilst when cooling it solidifies and grows resin-like.

Example 12

108 parts by weight of anisol are vigorously stirred together with 20 parts of a 60%-perchloric acid at 80° C. and 28 parts of butylene gas (obtained from n-butyl-alcohol by withdrawing water) are let in, then one cools, dilutes with benzene whilst the perchloric acid is separated off as in previous examples. Now one shakes out the benzene solution with a diluted solution of caustic soda in order to eliminate any secondarily formed butyl-phenol, whereupon one dries and fractionates. One thus obtains a good yield of a fraction boiling at 210–230° C. and representing a mixture of o- and p-secondary-butyl-anisol.

Example 13

Into a vigorously stirred solution of 50 parts of p, p'-dioxydiphenylmethane in a mixture of 102 parts of octa-hydronaphthalene and 300 parts of deca-hydronaphthalene, 20 parts of a 70%-perchloric acid are dropped in at 80° C. After a subsequent stirring for 4 hours at 90–100° C. the perchloric acid is eliminated in the usual way and the deca-hydronaphthalene is distilled off under reduced pressure, whereupon the thus obtained condensation product remains behind in the form of a resin.

Example 14

10 parts by weight of styrol, 11 parts by weight of resorcine, 10 parts by volume of anhydrous acetic acid and 10 parts by volume of a 25%-perchloric acid are mixed and the mixture is heated on the steam-bath in a loosely closed vessel under repeated shaking up. A little while after a vivid reaction is started which may eventually be moderated by cooling. After ceasing of the reaction the styrol which previously was floating on the surface has now disappeared and the solution has grown homogeneous in the warmth. This solution is still left for 2 hours on the steam-bath, then one lets steam stream in in order to expel the most part of the acetic acid and a small amount of styrol. Then one adds 50 parts by volume of benzene, separates from the aqueous layer, washes the benzene layer with salt water to make it neutral, whereupon one dries it with calcium chloride, expels the benzene and distills subsequently under reduced pressure. At a 11 mm. Hg-pressure and 218–231° C. 10.4 parts of a syrup clear as water pass over which also in the cold doesn't incline to crystallizing. To this body from $Bp_{11}$ 218–219° C. corresponds the formula of a (phenyl-ethyl-)resorcine and probably of the following constitution:

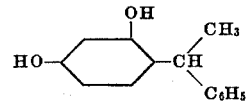

This product possesses valuable bactericide properties and it may likewise be employed as dyestuff component. The distillation residue consists of 6.6 parts of a clear, viscous, reddish yellow resin, apparently a di-(α-phenyl ethyl-) resorcine.

*Example 15*

166 parts by weight of o-cresoxy-acetic acid together with 423 parts of a crack-benzene fraction consisting of unsaturated and saturated portions boiling between 115 and 205° C. and having the iodine number 60.2 and the average molecular weight of 126.8 are stirred for 24 hours at 130° C. after an addition of 30 parts of a 70%-perchloric acid. Then one cools the mixture and eliminates the perchloric acid. The higher molecular alkyl-cresoxyacetic acids obtained by the condensation of the olefines with the o-cresoxy-acetic acid are now by boiling with a diluted solution of soda withdrawn from the saturated benzene which did not come into reaction. The strongly lathering solution is boiled with an excess of hydrochloric acid, whereby the raw alkyl-cresoxyacetic acids separate as a viscous heavy oil. They are purified by distillation in vacuo, whereby they pass over with a pressure of 2 mm. Hg and a temperature of between 185° C. and 225° C. (analysis: acid number 188.6, saponification number 194.5, hydroxyl number 0).

*Example 16*

In a vessel provided with a stirring gear, to 324 parts by weight of o-cresol a mixture of 5 parts of a 40% perchloric acid and 5 parts of concentrated hydrochloric acid is added, and the whole heated to 50° C. In the course of an hour 56 parts of octene are added to the mixture little by little and under stirring, whereupon—in order to complete the transformation—one continues stirring for 5 hours at 90° C. Then one eliminates the reaction catalyst by washing out with water or with a common salt solution. The p-iso-octyl-o-cresol appearing as condensation product is obtained by a fractional distillation. One gets the body with a 11 mm. Hg-pressure at between 155° C. and 165° C., the yield of which exceeds 80% of the theoretical yield.

Instead of the concentrated hydrochloric acid one may likewise employ the same weight of a 84%-phosphoric acid or of 90%-sulfuric acid.

*Example 17*

By following the method of working specified in Example 16 one may also proceed in adding to a mixture of 324 parts of o-cresol and 10 parts of concentrated hydrochloric acid, 3 parts of sodium-perchlorate and in heating to 50% C. Thereby a mixture of perchloric acid and hydrochloric acid serving as efficient catalyst is formed so that 56 parts of octene as specified in Example 16 allow of being condensed with the o-cresol in a smooth reaction and of a practically quantitative yield, whereby the p-iso-octyl-o-cresol is formed as condensation product.

*Example 18*

10 parts by weight of oleic acid, 10 parts by weight of phenol and 1 part by weight of a 70%-perchloric acid are heated under intensive stirring up to 90° C. within 3 hours, whereupon one continues stirring at 90–100° C. for 5 hours. Then the phenol that was employed in excess is blown off by steam. The non-volatile residue is dissolved in butanol and the solution saturated with hydrogen chloride. Then one boils for some hours at the reflux cooler, whereupon the excess of butanol is distilled off. Most part of the residue passes over under 1.5 mm. Hg-pressure at a temperature of about 250–260° C. The distillate is a nearly colourless and rather thick liquid and it represents the butyl-ester of an hydroxy-phenyl-stearic acid. The analysis shows a saponification number of 124 (theoretical 129.6). The product is easily hydrogenisable to the corresponding hydroxy-cyclo hexyl-stearic acid-butyl-ester, a syrup-like liquid from $Bp_{1.5}$ 240–244° C.

The brownish thickly-liquid residue of the distillation in vacuo is apparently the dibutyl ester of an hydroxy-phenylene-di-stearic acid obtained by the condensation of 1 mol of phenol with 2 mols of oleic acid.

*Example 19*

108 parts by weight of o-cresol and 92 parts by weight of undecylenic acid are heated to 90° C., whereupon 2 parts by volume of a 70%-perchloric acid are stirred in. Then one keeps the homogeneous mixture for 10 hours at a temperature of 90–100° C. and subsequently one blows off the excess of o-cresol by steam, the residue is dissolved in benzene, then one dries the benzene solution and evaporates the benzene. The residue left behind is then subject to the fractional distillation under a very reduced pressure. Under 2.8 mm. Hg and at a temperature of 210–230° C. a yellow thickly liquid substance ($Bp_{2.8}$ 223–224° C.) passes over and according to the analytic data it represents substantially a cresyl-undecanic acid of the possible constitution Formula I or II:

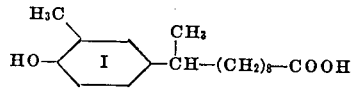

or

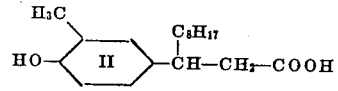

The residue after distilling in vacuo is a very viscous yellow substance, the analysis-numbers of which indicate a lactonic acid of the Formula III

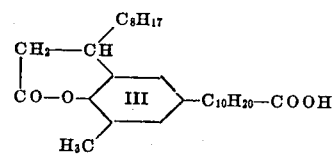

The total yield of both products together corresponds to the theoretical yield calculated on the applied undecylenic acid.

*Example 20*

108 parts by weight of p-cresol, 89 parts by weight of cyclohexylidene-cyclohexanone and 2 parts by volume of a 70%-perchloric acid are mixed at 35° C., whereby a clear solution is obtained. Now in the course of 2 hours one heats to 80° C. and keeps the temperature for 6 hours at 80–85° C., whereby the liquid assumes gradually a dark blue colour. Then by means of steam one blows off the cresol remaining unaltered, whereby the colour changes into brownish-yellow. The residue is dissolved in benzene and worked up as per Example 19. About ⅗ of the total amount of reaction product pass over under 1.8 mm. Hg-pressure at 160–210° C. The distillate forms a yellow liquid of a thickly-liquid consistency. As residue there remains a reddish-brown clear resin of a brittle hardness.

Example 21

141 parts by weight of sperm oil with the iodine number 90 at a temperature of 90–95° C. is added little by little to a mixture of 108 parts by weight of the technical mixture of the 3 cresols and 12 parts by volume of a 70%-perchloric acid which is vigorously stirred during the admixing. Now one stirs for 6 hours at 90–100° C., whereupon one expels the excess of cresol by means of steam. There remains a condensation product in the form of a mass which is viscous in the cold.

In a similar manner as with sperm oil one may likewise condense glycerides of non-saturated fatty and hydroxy fatty acids with phenols and naphthols.

Example 22

144 parts by weight of fine pulverized 2-naphthol, 500 parts by volume of deca-hydronaphthalene and 12 parts by volume of a 70%-perchloric acid are heated up to 90° C. and at 90–100° C., one adds 268 parts by weight of oleic alcohol little by little while the mixture is constantly stirred. After a subsequent stirring for several hours at the same temperature the deca-hydronaphthalene is blown off by steam. There is a condensation product left having the form of an extremely viscous oil which is separated from the aqueous liquid and dried.

Example 23

144 parts by weight of 2-naphthol are dissolved at 90° C. in 200 parts by volume of nitrobenzene. Then one adds 15 parts by volume of a 70%-perchloric acid. Now under constant stirring one adds 43 parts by weight of crotonic acid in small portions within about 2 hours at 90–95° C.; one continues stirring for 3 hours at 90–100° C., then the nitrobenzene and part of the exceeding 2-naphthol are blown off by steam and one separates the red and non-volatile condensation product from the aqueous liquid, whereupon one extracts it exhaustively with a hot 5%-solution of caustic soda. There remains a brownish-yellow, alkali-unsoluble condensation product which at water-bath temperature is liquid and it solidifies while cooling. It allows of being recrystallized from alcohol and thus it can be changed into colourless crystals. The alkaline filtrates are saturated in the cold with carbon di-oxide, whereby β-naphthol precipitates in a mixture with another condensation product of a phenolic character. The filtrate when acidified with hydrochloric acid until mineral-acid reaction gives a yellowish-white precipitate of small crystals which is filtered off and dried at 80° C. Its composition is $C_{14}H_{14}O_3$ and most probably it corresponds to the constitution Formula IV:

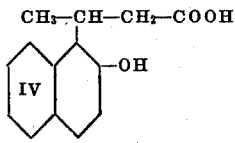

Example 24

144 parts by weight of 1-naphthol and 49 parts by weight of maleic acid anhydride are dissolved under a slight heating in 500 parts by volume of benzene. Then one adds at 35° C. 5 parts by volume of a 70%-perchloric acid. Now the temperature while constantly stirring is gradually increased to 45° C. and one continues stirring for 5 hours at 45–50° C. The benzene solution is poured off from the separated resin, then it is shaken out with a 5%-solution of caustic soda, whereupon the resin is extracted while warm with a 5%-solution of caustic soda. Thereby remains but a little amount of a dark alkali-unsoluble tar. The alkaline filtrates are united and saturated in the cold with carbon-di-oxide, whereby the mass grows paste-like by the 1-naphthol which is abundantly precipitated. Then the naphthol is filtered off, washed with water and to the united filtrates one adds hydrochloric acid until mineral-acid reaction is obtained. The resin which separates itself off is immediately filtered and the filtrate saturated with common salt. After leaving it for some time many yellowish-white flocks begin to precipitate which are then filtered, dissolved under addition of animal charcoal in hot water and precipitated afresh. The substance dried at 80° C. gives at the alkalimetric titration values which indicate a composition corresponding to a hydroxy-naphthyl-succinic acid. Taking into consideration that the substance with diazotized p-nitraniline gives in an alkaline solution a blue dyestuff whilst with acids its colour changes into red, the radical of succinic acid has apparently set in o-position to the naphthol-hydroxyl and the substance possesses probably the constitution Formula V:

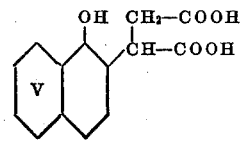

Example 25

5 parts by weight of cinnamic acid and 5 parts by weight of hydroquinone are dissolved under heating in 8 parts by volume of anhydrous acetic acid while adding 5 parts by volume of a 70%-perchloric acid. Now one heats the mixture for 4 hours in the steam-bath, whereby it grows reddish-yellow and then one stirs it into 200 parts by volume of cold water. Thereby a thick oil is separated which, when neutralizing the liquid with a solution of caustic soda, solidifies to a crumbly mass which is then filtered off and washed with water. The yield of raw 4-phenyl-6-hydroxy-hydrocoumarine amounts to 6.5 parts corresponding to 80% of the theoretical yield. By recrystallizing from benzene with an addition of some animal charcoal the product is obtained pure and it shows then the melting point of 132–133° C.

Example 26

500 parts by weight of chloro-naphthalene and 148 parts by weight of cinnamic acid are mixed under addition of 15 parts by volume of 70%-perchloric acid. Now the mixture is heated during 5 hours up to 110° C. A dark coloured fluid is obtained from which the reaction product is extracted by a hot 5% soda lye. In acidifying the aqueous alkaline fluid the formed β-phenyl-4′-chloronaphthylpropionic acid is separated in the form of a resin-like substance.

Example 27

A mixture of 300 parts by weight of α-methylnaphthalene and 5 parts by volume of 60%-perchloric acid is heated at a temperature of 50–60° C. Then at the same temperature 268 parts by weight of oleyl alcohol are slowly added while stirring, whereupon the temperature is kept during 5–6 hours at 90–100° C. After working up the reaction mixture in the usual manner one obtains as main product a thickly-liquid condensation product, the analysis of which indicates apparently the methyl-naphthyl-stearyl alcohol.

*Example 28*

360 parts by weight of o-cresol and 12 parts by volume of 60%-perchloric acid are warmed up to 60° C. Then while stirring 60 parts by weight of octadecadiene (obtained by dehydration of oleyl alcohol) are added during 1½ hours. The temperature is raised to 90° C,. and kept on 90–95° C. during 5 hours. Now the reaction mixture is washed with 10%-salt solution until it shows a neutral reaction, is dried with anhydrous sodium sulfate and fractionated under reduced pressure. After first runnings of unconverted o-cresol, 15 parts by weight of a yellow viscous fluid at temperatures between 130–210° C. and 72 parts by weight of a reddish-yellow extremely viscous resin at temperatures between 210–290° C. pass over under 1.3 mm. Hg-pressure. 4 parts by weight of a dark viscous resin remain as residue left after distillation.

I claim:

1. Method for condensation characterized by condensing compounds which contain at least one olefinic double link in the molecule with compounds containing at least one aromatic nucleus with at least one unsubstituted hydrogen atom in the aromatic nucleus in the presence of aqueous mixtures of perchloric acid together with mineral acid of the group consisting of sulfuric acid, hydrochloric acid, and phosphoric acid.

2. Method for condensation characterized by condensing o-cresol and octene in the presence of a mixture of perchloric and hydrochloric acid.

3. Method for condensation characterized by condensing a phenol and an olefin in the presence of an aqueous solution of perchloric acid and a mineral acid of the group consisting of sulfuric acid, hydrochloric acid and phosphoric acid.

ERIK SCHIRM.